(12) United States Patent
Kanbe et al.

(10) Patent No.: US 8,988,828 B2
(45) Date of Patent: Mar. 24, 2015

(54) MAGNETIC RECORDING MEDIUM AND MAGNETIC STORAGE APPARATUS

(71) Applicant: Showa Denko K.K., Tokyo (JP)

(72) Inventors: Tetsuya Kanbe, Chiba (JP); Kazuya Niwa, Chiba (JP); Yuji Murakami, Chiba (JP); Lei Zhang, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/316,950

(22) Filed: Jun. 27, 2014

(65) Prior Publication Data

US 2015/0009786 A1    Jan. 8, 2015

(30) Foreign Application Priority Data

Jul. 3, 2013    (JP) ................. 2013-139825

(51) Int. Cl.
| | | |
|---|---|---|
| G11B 5/667 | (2006.01) | |
| G11B 5/65 | (2006.01) | |
| G11B 20/10 | (2006.01) | |
| G11B 5/73 | (2006.01) | |
| G11B 5/00 | (2006.01) | |

(52) U.S. Cl.
CPC ............. *G11B 5/667* (2013.01); *G11B 5/653* (2013.01); *G11B 5/656* (2013.01); *G11B 20/10* (2013.01); *G11B 2005/0021* (2013.01); *G11B 2005/0024* (2013.01); *G11B 2020/10898* (2013.01); *G11B 5/7325* (2013.01)
USPC .......... 360/135; 360/75; 428/832.2; 428/827; 428/829

(58) Field of Classification Search
CPC ........ G11B 5/66; G11B 5/7325; G11B 5/656; G11B 5/64; G11B 5/65; G11B 5/667; G11B 5/732; G11B 2005/0021
USPC ................. 360/110, 135, 103, 75; 369/13.16; 428/828, 65.3, 831, 831.2, 827, 829
See application file for complete search history.

(56) References Cited

U.S. PATENT DOCUMENTS

| | | | |
|---|---|---|---|
| 6,248,416 B1 * | 6/2001 | Lambeth et al. ............ 428/832.2 |
| 7,067,206 B2 * | 6/2006 | Uwazumi et al. ........... 428/831.2 |
| 8,012,613 B2 * | 9/2011 | Takahashi et al. .......... 428/831.2 |
| 2010/0165510 A1 * | 7/2010 | Takahashi et al. ............ 360/135 |
| 2011/0122525 A1 * | 5/2011 | Nemoto et al. .................. 360/75 |
| 2011/0242702 A1 * | 10/2011 | Maeda .......................... 360/110 |
| 2013/0040167 A1 | 2/2013 | Alagarsamy et al. |

FOREIGN PATENT DOCUMENTS

| | | |
|---|---|---|
| JP | 2009-158053 | 7/2009 |
| JP | 2010-182386 | 8/2010 |
| JP | 2011-146089 | 7/2011 |

* cited by examiner

*Primary Examiner* — Ali Neyzari
(74) *Attorney, Agent, or Firm* — IPUSA, PLLC

(57) ABSTRACT

A magnetic recording medium includes a substrate, a magnetic layer including an alloy having an $L1_0$ type crystal structure, and a plurality of underlayers arranged between the substrate and the magnetic layer. At least one of the plurality of underlayers is a soft magnetic underlayer formed by an alloy having a hexagonal close packed (hcp) structure and including Co metal or Co as its main component, with a (11•0) plane oriented parallel to a surface of the substrate.

12 Claims, 3 Drawing Sheets

MAGNETIC RECORDING MEDIUM AND MAGNETIC STORAGE APPARATUS

CROSS-REFERENCE TO RELATED APPLICATIONS

This application is based upon and claims the benefit of priority of Japanese Patent Application No. 2013-139825 filed on Jul. 3, 2013, the entire contents of which are incorporated herein by reference.

BACKGROUND OF THE INVENTION

1. Field of the Invention

The present invention relates to a magnetic recording medium and a magnetic storage apparatus.

2. Description of the Related Art

Recently, demands to increase storage capacities of HDDs (Hard Disk Drives) are increasing. As one means of satisfying such demands, a heat-assisted recording method and a microwave-assisted recording method have been proposed.

The heat-assisted recording method performs recording with respect to a magnetic recording medium using a magnetic head mounted with a laser light source, by heating the magnetic recording medium by the magnetic head. The microwave-assisted recording method performs recording on the magnetic recording medium by applying a high-frequency magnetic field from the magnetic head.

The heat-assisted recording method can reduce the coercivity of the magnetic recording medium by heating the magnetic recording medium and enable use of a magnetic material having a high crystal magnetic anisotropy constant Ku (hereinafter also referred to as a "high-Ku material") for a magnetic layer of the magnetic recording medium. For this reason, the magnetic grain size of the magnetic layer can be reduced while maintaining thermal stability, and a surface recording density on the order of 1 Tbits/inch$^2$ can be achieved.

On the other hand, the microwave-assisted recording method can perform the recording with respect to the magnetic recording medium with a recording magnetic field lower than or equal to the coercivity of the magnetic recording medium, by the assistance of the high-frequency magnetic field generated from an STO (Spin Torque Oscillator) mounted on the magnetic head. For this reason, similarly as in the case of the heat-assisted recording method, the microwave-assisted recording method can use a high-Ku material for the magnetic layer of the magnetic recording medium.

The high-Ku material includes ordered alloys, such as $L1_0$ type FePt alloys, $L1_0$ type CoPt alloys, $L1_1$ type CoPt alloys, or the like.

In addition, in order to isolate (or separate) crystal grains of the ordered alloy, the magnetic layer is added with a grain boundary material, such as an oxide including $SiO_2$, $TiO_2$, or the like, or C, BN, or the like. By employing a granular structure in which the magnetic crystal grains are separated at the grain boundary, an exchange coupling between the magnetic grains is reduced compared to a case in which the grain boundary material is not added, and a high medium SNR (Signal-to-Noise Ratio) can be achieved.

On the other hand, a write characteristic or an overwrite characteristic can be improved by forming a soft magnetic underlayer (or soft magnetic back layer).

Japanese Laid-Open Patent Publication No. 2009-158053, for example, proposes using a FeCoTaZr amorphous alloy for the soft magnetic underlayer. In addition, Japanese Laid-Open Patent Publications No. 2010-182386 and No. 2011-146089, for example, propose using a soft magnetic underlayer having a crystalline structure of NiFe, CoF alloy, or the like, or using a soft magnetic underlayer having a microcrystalline structure of FeTaC alloy or the like. In the magnetic recording medium that uses an $L1_0$ type FePt alloy for the magnetic layer and has a high Ku value, a substrate is generally heated to a temperature of 500° C. or higher, in order to improve the ordering of the $L1_0$ type crystal structure. For this reason, the material used for the soft magnetic underlayer of such a magnetic recording medium is selected so that the soft magnetic characteristics will not be deteriorated by the heating to the temperature of 500° C. or higher.

Recently, however, there are demands to further improve the medium SNR and the overwrite characteristic. Such demands are difficult to satisfy by the method of adding the grain boundary material to the magnetic layer, and the method of providing the soft magnetic underlayer.

SUMMARY OF THE INVENTION

Embodiments of the present invention may provide a magnetic recording medium and a magnetic storage apparatus having a high medium SNR and a good overwrite characteristic.

According to one aspect of the embodiment, a magnetic recording medium includes a substrate; a magnetic layer including an alloy having an $L1_0$ type crystal structure; and a plurality of underlayers arranged between the substrate and the magnetic layer, wherein at least one of the plurality of underlayers is a soft magnetic underlayer formed by an alloy having a hexagonal close packed (hcp) structure and including Co metal or Co as its main component, with a (11•0) plane oriented parallel to a surface of the substrate.

Other objects and further features of the present invention will be apparent from the following detailed description when read in conjunction with the accompanying drawings.

DESCRIPTION OF THE PREFERRED EMBODIMENTS

Figure 1:
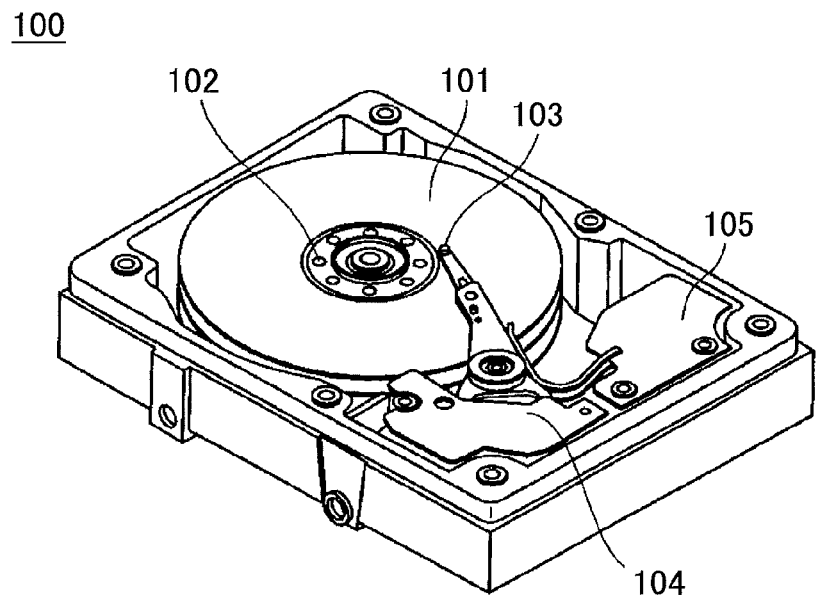
FIG. 1 is a perspective view schematically illustrating a configuration of an example of a magnetic storage apparatus in a second embodiment of the present invention.

A description will be given of a magnetic recording medium and a magnetic storage apparatus in each embodiment of the present invention, by referring to the drawings. The present invention is not limited to the described embodiments, and various variations, modification, and substitutions may be made without departing from the scope of the present invention.

First Embodiment

A description will be given of a configuration of an example of a magnetic recording medium in this embodiment.

The magnetic recording medium in this embodiment includes a substrate, a magnetic layer including an alloy having an $L1_0$ type crystal structure, and a plurality of underlayers arranged between the substrate and the magnetic layer. Amongst the plurality of underlayers, at least one underlayer may be a soft magnetic underlayer formed by an alloy having an hcp (hexagonal close packed) structure and including Co metal or Co as its main component, with a (11•0) plane oriented parallel to a substrate surface.

A description will be given of each of the layers of the magnetic recording medium.

The substrate is not limited to a particular substrate material. For example, a glass substrate, and particularly a heat-resistant glass substrate may be used for the substrate.

In the magnetic recording medium of this embodiment, the plurality of underlayers are provided between the substrate and the magnetic layer having a $L1_0$ type crystal structure, as will be described later.

At least one of the plurality of underlayers may be formed by the soft magnetic underlayer. The soft magnetic underlayer will be described later.

A magnetic anisotropy of the soft magnetic underlayer is preferably oriented in an in-plane direction. In addition, an alloy in the magnetic layer and having the $L1_0$ type crystal structure preferably has a (001) orientation, as will be described later. For this reason, the soft magnetic underlayer is preferably made of a material that does not interfere with the (001) orientation of the alloy having the $L1_0$ type crystal orientation.

The soft magnetic underlayer may be formed by the alloy having the hcp structure and including Co metal or Co as its main component, with the (11•0) plane oriented parallel to the substrate surface.

The Co metal or Co alloy used for the soft magnetic underlayer is crystalline, however, has a function to improve a medium SNR, a write characteristic, and an overwrite characteristic (or overwrite performance) OW. In addition, because the (11•0) plane of the Co metal or Co alloy used for the soft magnetic underlayer is oriented parallel to the substrate surface, a magnetization direction of the soft magnetic underlayer becomes the in-plane direction, and a reproducing head is not greatly affected thereby at the time of the signal reproduction.

The soft magnetic underlayer preferably has a high magnetization, and an added amount (or content) of an element added to the Co alloy is preferably small. However, in order to minimize a lattice misfit (or mismatch) or to increase the magnetization, the soft magnetic underlayer includes at least one kind of element selected from a group of elements consisting of Fe, Ni, Cr, Mn, V, Ru, Re, Pt, and Pd. The added amount (or content) of the element added to the Co alloy is not limited to a certain amount as long as the hcp structure of the Co alloy is not deteriorated thereby, and for example, the added amount of the element added to the Co alloy is preferably on the order of approximately 30 at % or less.

The soft magnetic underlayer may have a single-layer structure made of the Co metal or Co alloy described above, or a stacked structure having a nonmagnetic intermediate layer interposed between stacked layers of the Co metal or Co alloy. The nonmagnetic intermediate layer is not limited to a particular material, and may be formed by V, Cr, Ru, Cu, Ir, Nb, Mo, Re, Rh, Ta, W, Re, or the like, for example. The soft magnetic underlayer formed by the Co metal or Co alloy may be anti-ferromagnetically coupled via the intermediate layer, in order to cancel leakage magnetization and medium noise.

As described above, the soft magnetic underlayer may have the (11•0) plane oriented parallel to the substrate surface. A method of making the (11•0) plane to become oriented parallel to the substrate surface is not limited to a particular method. For example, a first orientation control underlayer may be provided, and the soft magnetic underlayer may be formed on the first orientation control underlayer. In other words, the plurality of underlayers preferably include an orientation control underlayer, and have the soft magnetic underlayer formed on the orientation control underlayer.

A structure of the first orientation control underlayer is not limited to a particular structure, as long as the soft magnetic underlayer having the hcp structure and including the Co metal or Co alloy can be made to have the (11•0) orientation. In addition, the first orientation control underlayer may be formed by a plurality of layers. Further, the first orientation control underlayer may be formed by an alloy having a body centered cubic (bcc) structure and including Cr metal or Cr as its main component.

The alloy of the first orientation control underlayer, including Cr as its main component and having the bcc structure, may include at least one kind of element selected from a group of elements consisting of Mn, V, Ti, Mo, W, Nb, and Ru. In other words, the alloy including Cr as its main component and having the bcc structure may be an alloy such as CrTi, CrV, CrMn, CrMo, CrW, CrRu, or the like, for example.

The alloy including Cr as its main component refers to an alloy in which Cr has a largest amount of substance in a ratio of amounts of substances, amongst the components (or elements) forming the alloy. The main component of other alloys described in the specification are also used to have similar meanings.

In addition, the alloy of the first orientation control underlayer may be an NiAl alloy or an RuAl alloy having a B2 structure. Moreover, the first orientation control underlayer may be made of MgO, for example.

When forming the first orientation control underlayer described above, the soft magnetic underlayer is preferably formed on (or above) the first orientation control underlayer, and more preferably formed directly on the first orientation control underlayer.

When providing a heat sink layer, a heat barrier layer, or the like, the first orientation control underlayer can control the orientation of such a layer, other than the soft magnetic underlayer, to have a desired orientation.

The first orientation control underlayer preferably has the (100) orientation, in order to make the soft magnetic underlayer have the (11•0) orientation. By forming the soft magnetic underlayer, formed by the Co metal or Co alloy, on the first orientation control underlayer, the soft magnetic underlayer formed by the Co metal or Co alloy can be made to have the (11•0) orientation. This is because the Co metal or Co alloy is epitaxially grown on the first orientation control underlayer. In order to promote good epitaxial growth, a lattice mismatch (or misfit) between the (11•0) plane of the Co metal or Co alloy forming the soft magnetic underlayer and the (100) plane of the first orientation control underlayer is preferably on the order of approximately 10% or less. In the case in which the first orientation control underlayer is formed by the Cr alloy, for example, the lattice constant of the first orientation control underlayer may be adjusted by the amount of the element added to Cr.

The plurality of underlayers may further include the heat sink layer. The structure of the heat sink layer is not limited to a particular structure. For example, the heat sink layer may be formed by Cu, Ag, Au, Al, or an alloy that includes such an element as it main component.

A position where the heat sink layer is arranged is not limited to a particular position. For example, a plurality of first orientation control underlayers may be provided, and the heat sink layer may be arranged between two adjacent first orientation control underlayers.

Next, a description will be given of the magnetic layer.

The magnetic layer may be formed by an alloy having the $L1_0$ type crystal structure. The alloy having the $L1_0$ type crystal structure is not limited to a particular alloy. For example, FePt alloys having the $L1_0$ type crystal structure, or CoPt alloys having the $L1_0$ type crystal structure, may preferably be used for the alloy having the $L1_0$ type crystal structure. In the magnetic layer, the alloy having the $L1_0$ type crystal structure is preferably included as its main component. The alloy having the $L1_0$ type crystal structure and included in the magnetic layer as its main component refers to a component having a largest amount of substance in a ratio of amounts of substances, amongst the components (or elements) forming the magnetic layer.

In the magnetic layer, crystal grains of the alloy having the $L1_0$ type crystal structure are preferably magnetically isolated. For this reason, the magnetic layer preferably includes a grain boundary material. More particularly, the grain boundary material forming the magnetic layer preferably includes at least one kind of material selected from a group of materials consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN. By including the grain boundary material in the magnetic layer, an exchange coupling between the magnetic grains is reduced compared to a case in which the grain boundary material is not included, and the medium noise can be reduced.

In order to promote ordering of the ordered alloy having the $L1_0$ type crystal structure, the substrate temperature at the time of forming the magnetic layer is preferably 600° C. or higher. In addition, in order to lower the ordering temperature, Ag, Au, Cu, Ni, or the like may be added to the alloy having the $L1_0$ type crystal structure. In this case, the substrate temperature at the time of forming the magnetic layer can be reduced to a temperature in a range of approximately 400° C. to approximately 500° C. The substrate is preferably the heat-resistant glass substrate so that the substrate can withstand the heat at the time of forming the magnetic layer when the substrate temperature is set to the temperature described above.

The magnetic layer is preferably formed on the soft magnetic underlayer via the heat barrier layer. The heat barrier layer can suppress heat diffusion in a direction from the magnetic layer towards the substrate and allow the temperature of the magnetic layer to increase, when the magnetic layer is heated by a laser light source at the time of the recording using the heat-assisted recording method. In addition, the provision of the heat barrier layer can facilitate the (001) orientation of the alloy having the $L1_0$ type crystal structure and used for the magnetic layer.

In a case in which the heat barrier layer is provided, the material used for the heat barrier layer preferably has a relatively low heat conductivity and a lattice constant close to the (001) plane of the alloy having the $L1_0$ type crystal structure. More particularly, the heat barrier layer is preferably made of TiN, TaN, TiC, MgO, NiO, or the like having a NaCl type structure, for example.

In order to make the alloy having the $L1_0$ type crystal structure have the (001) orientation, when providing the heat barrier layer, the heat barrier layer preferably has a (100) orientation. In addition, in order to obtain a good (100) orientation of the heat barrier layer, a second orientation control underlayer may further be arranged between the soft magnetic underlayer and the heat barrier layer.

In a case in which the second orientation control underlayer is provided between the soft magnetic underlayer and the heat barrier layer, the material used for the second orientation control underlayer is not limited to a particular material, however, the lattice mismatch (or misfit) of the material is preferably small with respect to both the soft magnetic underlayer and the heat barrier layer. In addition, a material having a large lattice constant may be used for the heat barrier layer, in order to introduce tensile stress in the in-plane direction of the heat barrier layer. By enlarging the crystal lattice of the heat barrier layer in the in-plane direction, the crystal lattice of the alloy having the $L1_0$ type crystal structure is also enlarged in the in-plane direction, and the ordering of the alloy having the $L1_0$ type crystal structure can further be improved. Moreover, a material having a high heat conductivity may be used for the second orientation control underlayer, in order to function as the heat sink layer.

Therefore, in the case in which the second orientation control underlayer is arranged between the soft magnetic underlayer and the heat barrier layer, the second orientation control underlayer is preferably made of one of metals selected from a group consisting of Cr, V, Mo, W, Ta, and Nb, or made of an alloy having a bcc structure and including, as its main component, at least one metal (or element) selected from a group of elements consisting of Cr, V, Mo, W, Ta, and Nb. Further, the second orientation control underlayer arranged between the soft magnetic underlayer and the heat barrier layer is preferably made of an alloy or the like having an fcc (face centered cubic) structure and including Ag or Ag as its main component.

The material forming the second orientation control underlayer has the (100) orientation when epitaxially grown on the soft magnetic underlayer having the (11•0) orientation. For this reason, the heat barrier layer that is formed on the second orientation control underlayer can be made to have the (100) orientation. The second orientation control underlayer may have the single-layer structure formed by a single layer of the metal or alloy described above, or the multi-layer structure formed by a plurality of layers of the metal or alloy described above. In a case in which the multi-layer structure is employed for the second orientation control underlayer, a part of or all of the layers forming the multi-layer structure of the second orientation control underlayer may function as the heat sink layer.

A DLC (Diamond-Like Carbon) protection layer is preferably formed on the magnetic layer.

A method of forming the DLC protection layer is not limited to a particular method. For example, an RF-CVD (Radio Frequency-Chemical Vapor Deposition) method, an IBD (Ion Beam Deposition) method, an FCVA (Filtered Cathodic Vacuum Arc) method, or the like may be used to form the DLC protection layer. The RF-CVD method may deposit the DLC protection layer by decomposing a source gas including hydrocarbon by high-frequency plasma. The IBD method may deposit the DLC protection layer by ionizing a source gas by electrons emitted from a filament. The FCVA method may deposit the DLC protection layer using a solid carbon (C) target, without the use of a source gas.

A thickness of the DLC protection layer is not limited to a particular thickness, however, the thickness of the DLC protection layer is preferably 1 nm or greater and 6 nm or less, for example. In a case in which the thickness of the DLC layer is less than 1 nm, a floating characteristic of the magnetic head may deteriorate. On the other hand, in a case in which the thickness of the DLC layer is greater than 6 nm, a magnetic spacing becomes large, and the medium SNR may deteriorate.

A lubricant layer made of a fluororesin, such as perfluoropolyether resin, may be coated on the DLC protection layer.

Other layers, such as a seed layer, a bonding layer, or the like may be additionally provided, if necessary.

The magnetic recording medium in this embodiment includes the predetermined soft magnetic underlayer made of the Co metal or Co alloy. For this reason, the magnetic recording medium has a high medium SNR and a good overwrite characteristic. In addition, the magnetic recording medium in this embodiment is suited for the heat-assisted recording method and the microwave-assisted recording method.

Second Embodiment

Next, a description will be given of an example of a configuration of a magnetic storage apparatus in a second embodiment. In this embodiment, it is assumed for the sake of convenience that the magnetic storage apparatus employs the heat-assisted recording method, however, the recording method employed in the magnetic storage apparatus is not limited to the heat-assisted recording method. The magnetic recording medium in the first embodiment described above may be used in the magnetic storage apparatus employing the microwave-assisted recording method.

The magnetic storage apparatus in this embodiment may include the magnetic recording medium in the first embodiment described above.

The magnetic storage apparatus may include, for example, a medium drive unit configured to rotate the magnetic recording medium, and a magnetic head having a near-field light generating element on a tip end part thereof. The magnetic storage apparatus may further include a laser generating unit configured to heat the magnetic recording medium, a waveguide configured to guide laser light emitted from a laser generating unit to the near-field light generating element, a head drive unit configured to move the magnetic head, and a signal processing system to process signals to be recorded on the magnetic recording medium and signals reproduced from the magnetic recording medium by the magnetic head.

FIG. 1 is a perspective view schematically illustrating a configuration of an example of the magnetic storage apparatus in the second embodiment of the present invention.

A magnetic storage apparatus 100 in this embodiment may have the configuration illustrated in FIG. 1. More particularly, the magnetic storage apparatus 100 may include a magnetic recording medium 101, a medium drive unit 102 that rotates the magnetic recording medium 101, a magnetic head 103, a head drive unit 104 that moves the magnetic head 103, and a signal processing system 105 that processes signals to be recorded on the magnetic recording medium 101 and signals reproduced from the magnetic recording medium 101 by the magnetic head 103.

Figure 2:
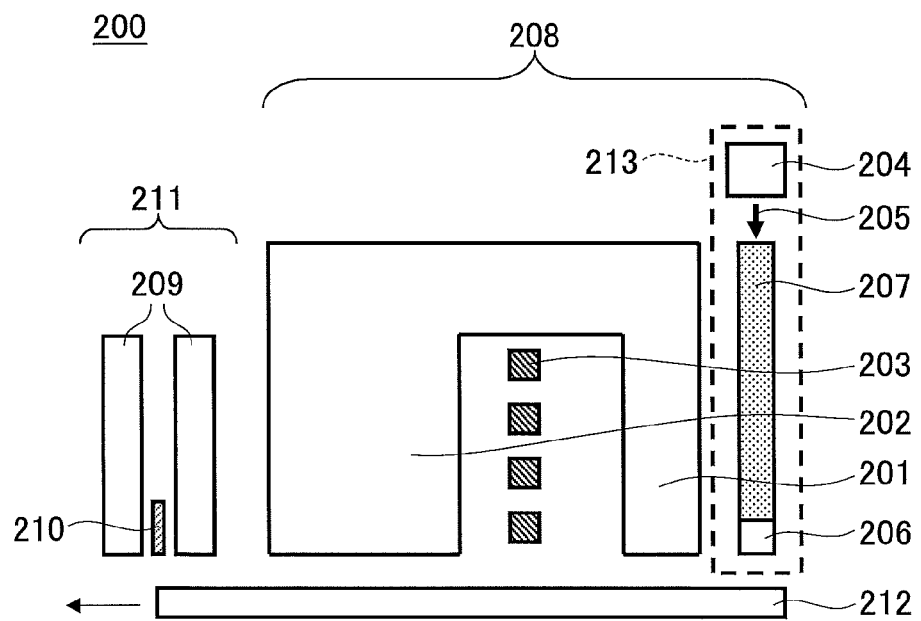
FIG. 2 is a diagram illustrating a configuration of an example of a magnetic head in a second embodiment of the present invention.

FIG. 2 is a diagram illustrating a configuration of an example of the magnetic head in the second embodiment of the present invention. A heat-assisted recording head 200 illustrated in FIG. 2 may be used for the magnetic head 103 illustrated in FIG. 1. The heat-assisted recording head 200 includes a recording head 208 and a reproducing head 211. The recording head 208 includes a main magnetic pole 201, an auxiliary magnetic pole 202, a coil 203 that generates a magnetic field, a laser diode (LD) 204 that forms a laser generating unit, and a waveguide 207 that guides laser light 205 generated from the laser diode 204 to a near-field light generating element 206. The reproducing head 211 includes a reproducing element 210 sandwiched between shields 209.

A magnetic recording medium 212 illustrated in FIG. 2 may be formed by the magnetic recording medium 101 in the first embodiment described above. Hence, an error rate of the magnetic storage apparatus 100 may be reduced.

PRACTICAL EXAMPLES

Next, a description will be given of practical examples of the present invention. However, the present invention is not limited to these practical examples which are merely examples.

Practical Examples Emb1

Figure 3:
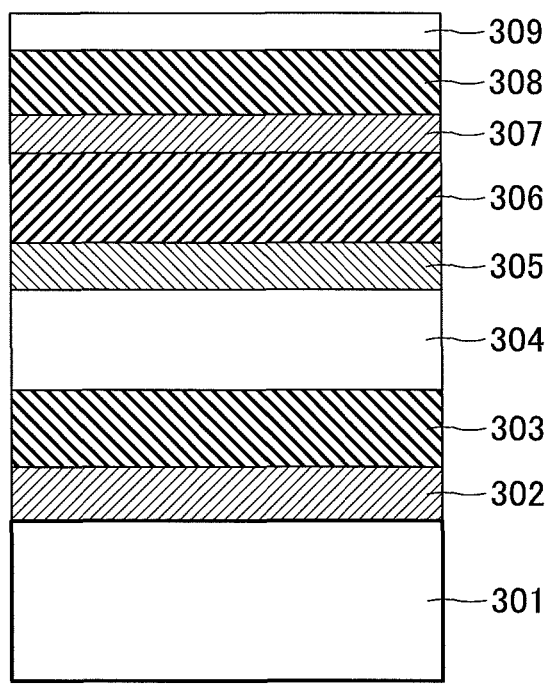
FIG. 3 is a cross sectional view schematically illustrating a layer structure of a magnetic recording medium according to practical examples emb1.

FIG. 3 is a cross sectional view schematically illustrating a layer structure of a magnetic recording medium 300 fabricated in accordance with practical examples emb1.

A bonding layer 302 made of Ti-45 at % Al and having a thickness of 30 nm is formed on a 2.5-inch (diameter) heat-resistant glass substrate 301, and a substrate heating process (or heat treatment) is performed at 300° C.

Next, a first orientation control underlayer 303 made of Cr-10 at % Mn and having a thickness of 30 nm is formed on the bonding layer 302, and a soft magnetic underlayer 304 having a thickness of 100 nm is formed on the first orientation control underlayer 303. More particularly, the materials used for the soft magnetic underlayer 304 is Co-10 at % Fe for a practical example Emb1.1, Co-20 at % Ni for a practical example Emb1.2, Co-5 at % Fe-5 at % Ni for a practical example Emb1.3, Co-15 at % Mn for a practical example Emb1.4, Co-25 at % V for a practical example Emb1.5, Co-20 at % Ru for a practical example Emb1.6, Co-10 at % Fe-10 at % Ru for a practical example Emb1.7, Co-20 at % Re for a practical example Emb1.8, Co-6 at % Pt for a practical example Emb1.9, and Co-12 at % Pd for a practical example Emb1.10. In a comparison example Cmp1, no soft magnetic underlayer 304 is formed, and a second orientation control underlayer 305 is formed directly on the first orientation control underlayer 303.

Next, the second orientation control underlayer 305 made of Cr-30 at % Mo and having a thickness of 10 nm, a heat sink layer 306 made of Ag-10 at % Pd and having a thickness of 30 nm, and a heat barrier layer 307 made of TiN and having a thickness of 4 nm are successively formed on the soft magnetic underlayer 304, and a substrate heating process (or heat treatment) is performed at 600° C. In addition, a magnetic layer 308 made of (Fe-50% Pt)-30 at % C-5 mol % BN and having a thickness of 8 nm is formed on the heat barrier layer 307, and a protection layer 309 made of DLC and having a thickness of 3 nm is formed on the magnetic layer 308.

X-ray diffraction measurements are performed with respect to the magnetic recording medium in each of the practical examples Emb1.1 through Emb1.10. As a result of these measurements, it is confirmed that no clear diffraction peak is observed from the TiAl bonding layer 302 of each of the practical examples Emb1.1 through Emb1.10. In addition, only a bcc (200) diffraction peak is observed from the CrMn first orientation control underlayer 303, and only an hcp (11•0) diffraction peak is observed from the soft magnetic underlayer 304. These observations indicate that the Co alloy having the hcp structure is epitaxially grown to have the (11•0) orientation on the CrMn first orientation control underlayer 303 having the (100) orientation. Further, only a (200) peak is observed from the CrMo second orientation control underlayer 305 and the AgPd heat sink layer 306 that are formed on the soft magnetic underlayer 304. Accordingly, these observations also indicate that the CrMo second orientation control underlayer 305 and the AgPd heat sink layer 306 are also epitaxially grown to have the (100) orientation.

No clear diffraction peak is observed from the TiN heat barrier layer 307 because the thickness thereof is small. However, a $L1_0$-FePt (001) diffraction peak, and a mixed diffraction peak of $L1_0$-FePt (002) and fcc-FePt (200) are observed from the magnetic layer 308, and it may be regarded that the TiN heat barrier layer 307 has the NaCl type structure with the (100) orientation.

An intensity ratio of the $L1_0$-FePt (001) diffraction peak with respect to the mixed diffraction peak of $L1_0$-FePt (002) and fcc-FePt (200) indicates a high value of 1.8, for example, and it is confirmed that the $L1_0$ ordering of the FePt alloy is extremely good.

A perfluoropolyether lubricant is coated on the surface of the magnetic recording medium in each of the practical examples Emb1.1 through Emb1.10 and the comparison example Cmp1, and recording and reproducing characteristics are evaluated using the heat-assisted recording head 200 illustrated in FIG. 2.

The heat-assisted recording head 200 used in this embodiment includes the recording head 208 and the reproducing head 211, as illustrated in FIG. 2. The recording head 208 includes the main magnetic pole 201, the auxiliary magnetic pole 202, the coil 203 that generates a magnetic field, the laser diode (LD) 204 that forms the laser generating unit, and the waveguide 207 that guides laser light 205 generated from the laser diode 204 to the near-field light generating element 206. The reproducing head 211 includes the reproducing element 210 sandwiched between the shields 209. The magnetic recording medium 212 is heated by the near-field light generated from the near-field light generating element 206, and the recording can be performed with a coercivity of the magnetic recording medium 212 reduced to the head magnetic field or lower.

The recording and reproducing characteristics of the magnetic recording medium in each of the practical examples Emb1.1 through Emb1.10 and the comparison example Cmp1 are evaluated using the medium SNR and the overwrite characteristic OW of the magnetic recording medium that are obtained using the heat-assisted recording head 200 described above. The evaluation is carried out at a linear recording density of 1600 kFCI, and a power of the laser diode (LD) 204 is adjusted so that a half-value width of a track profile becomes 55 nm. Results of the evaluation are illustrated in Table 1.

TABLE 1

| | SOFT MAGNETIC UNDERLAYER | MEDIUM SNR (dB) | OW (dB) |
|---|---|---|---|
| Emb1.1 | Co—10 at %Fe | 11.2 | 42.1 |
| Emb1.2 | Co—20 at %Ni | 10.9 | 40.5 |
| Emb1.3 | Co—5 at %Fe—5 at %Ni | 11.7 | 38.3 |
| Emb1.4 | Co—15 at %Mn | 11.5 | 37.7 |
| Emb1.5 | Co—25 at %V | 10.5 | 36.9 |
| Emb1.6 | Co—20 at %Ru | 12.6 | 38.8 |
| Emb1.7 | Co—10 at %Fe—10 at %Ru | 12.1 | 41.1 |
| Emb1.8 | Co—20 at %Re | 12.5 | 39.1 |
| Emb1.9 | Co—6 at %Pt | 13.3 | 36.1 |
| Emb1.10 | Co—12 at %Pd | 12.8 | 38.3 |
| Cmp1 | — | 9.3 | 31.8 |

It is confirmed from Table 1 that the magnetic recording medium in each of the practical examples Emb1.1 through Emb1.10 has a high medium SNR of 10.5 dB or higher, and an overwrite characteristic OW of 36 dB or higher.

Particularly the magnetic recording medium in each of the practical examples Emb1.6 through Emb1.10 that use the soft magnetic underlayer 304 including Ru, Re, Pt, or Pd, it is confirmed that the medium SNR is 12 dB or higher and is extremely high.

In addition, the magnetic recording medium in each of the practical examples Emb1.1, Emb1.2, and Emb1.7 that use the soft magnetic underlayer 204 including Fe or Ni has a high overwrite characteristic OW of 40 dB or higher. On the other hand, the magnetic recording medium in the comparison example Cmp1 that includes no soft magnetic underlayer 304 has a medium SNR and an overwrite characteristic OW that are greatly deteriorated compared to those of the magnetic recording medium in each of the practical examples Emb1.1 through Emb1.10.

According to the evaluation results of Table 1, it is confirmed that, by forming the predetermined soft magnetic underlayer, the medium SNR and the overwrite characteristic OW can be greatly improved.

Practical Example Emb2

Figure 4:
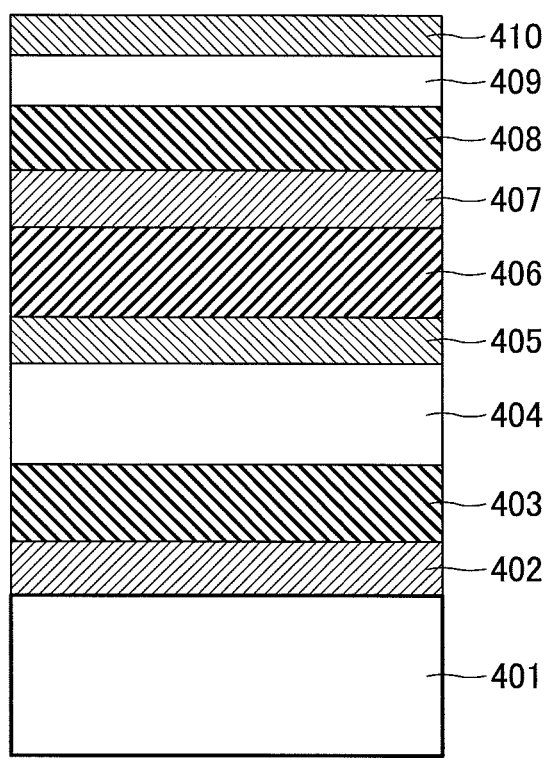
FIG. 4 is a cross sectional view schematically illustrating the layer structure of the magnetic recording medium according to practical examples emb2.

FIG. 4 is a cross sectional view schematically illustrating a layer structure of a magnetic recording medium 400 fabricated in accordance with practical examples emb2.

A bonding layer 402 made of Cr-50 at % Ti and having a thickness of 30 nm is formed on a 2.5-inch (diameter) heat-resistant glass substrate 401, a substrate heating process (or heat treatment) is thereafter performed at 300° C., and a first orientation control underlayer 403 made of Cr-20 at % Mo and having a thickness of 20 nm is formed on the bonding layer 402.

Next, a heat sink layer 404 made of Ag-1 at % Bi and having a thickness of 50 nm, a second orientation control underlayer 405 made of Cr-20 at % Mo and having a thickness of 10 nm, and a soft magnetic underlayer 406 having a thickness of 30 nm are successively formed on the first orientation control underlayer 403. More particularly, the materials used for the soft magnetic underlayer 406 is Co-10 at % Fe-10 at % Cr for a practical example Emb2.1, Co-10 at % Fe-10 at % Ru for a practical example Emb2.2, Co-20 at % Fe-10 at % Pt for a practical example Emb2.3, Co-20 at % Fe-15 at % Pd for a practical example Emb2.4, Co-15 at % Ni-10 at % V for a practical example Emb2.5, and Co-20 at % Ni-8 at % Pd for a practical example Emb2.6. In a comparison example Cmp2, no soft magnetic underlayer 406 is formed, and a third orientation control underlayer 407 is formed directly on the second orientation control underlayer 405.

Next, the third orientation control underlayer 407 made of Cr-20 at % Mo and having a thickness of 20 nm, a heat barrier layer 408 made of MgO and having a thickness of 2 nm, and a magnetic layer 409 made of (Fe-45% atPt)-30 at % C and having a thickness of 7 nm are successively formed on the soft magnetic underlayer 406.

In addition, a protection layer 410 made of DLC and having a thickness of 3 nm is formed on the magnetic layer 409.

A perfluoropolyether lubricant is coated on the surface of the magnetic recording medium in each of the practical examples Emb2.1 through Emb2.6 and the comparison example Cmp2, and recording and reproducing characteristics are evaluated using the heat-assisted recording head 200 illustrated in FIG. 2, in a manner similar to that described above for the practical examples Emb1.1 through Emb1.10 and the comparison example Cmp1. More particularly, the recording and reproducing characteristics of the magnetic recording medium in each of the practical examples Emb2.1 through Emb1.6 and the comparison example Cmp2 are evaluated using the medium SNR and the overwrite characteristic OW of the magnetic recording medium that are obtained using the heat-assisted recording head 200 described above under conditions similar to those described above for the practical examples Emb1.1 through Emb1.10 and the comparison example Cmp1. Results of the evaluation are illustrated in Table 2.

TABLE 2

|  | SOFT MAGNETIC UNDERLAYER | MEDIUM SNR (dB) | OW (dB) |
|---|---|---|---|
| Emb2.1 | Co—10 at %Fe—10 at %Cr | 10.1 | 34.4 |
| Emb2.2 | Co—10 at %Fe—10 at %Ru | 11.6 | 37.7 |
| Emb2.3 | Co—20 at %Fe—10 at %Pt | 10.9 | 33.9 |
| Emb2.4 | Co—20 at %Fe—15 at %Pd | 11.1 | 34.1 |
| Emb2.5 | Co—15 at %Ni—10 at %V | 10.2 | 33.3 |
| Emb2.6 | Co—20 at %Ni—8 at %Pd | 10.5 | 34.7 |
| Cmp2 | — | 8.8 | 29.5 |

It is confirmed from Table 2 that the magnetic recording medium in each of the practical examples Emb2.1 through Emb2.6 has a high medium SNR of 10 dB or higher, and an overwrite characteristic OW of 33 dB or higher.

Particularly the magnetic recording medium in each of the practical example Emb2.2 that uses the soft magnetic underlayer 304 made of an Co—Fe—Ru alloy, it is confirmed that both the medium SNR and the overwrite characteristic OW are extremely high.

On the other hand, the magnetic recording medium in the comparison example Cmp2 that includes no soft magnetic underlayer 406 has a medium SNR of 9 dB or lower and an overwrite characteristic OW of 30 dB or lower, which are greatly deteriorated compared to those of the magnetic recording medium in each of the practical examples Emb2.1 through Emb2.6.

According to the evaluation results of Table 2, it is confirmed that, by forming the predetermined soft magnetic underlayer, the medium SNR and the overwrite characteristic OW can be greatly improved.

Practical Example Emb3

In practical examples Emb3, the magnetic recording medium in each of the practical examples Emb1.1 through Emb1.10 and the comparison example Cmp1 is assembled within the magnetic storage apparatus 100 illustrated in FIG. 1.

The magnetic storage apparatus 100 used in the practical examples Emb3 includes the magnetic recording medium 101, the medium drive unit 102 that rotates the magnetic recording medium 101, the magnetic head 103, the head drive unit 104 that moves the magnetic head 103, and the signal processing system 105 that processes signals to be recorded on the magnetic recording medium 101 and signals reproduced from the magnetic recording medium 101 by the magnetic head 103. The heat-assisted recording head 200 illustrated in FIG. 2 and used in the practical examples Emb1 is used for the magnetic head 103.

Table 3 illustrates a BER (Bit Error Rate) that is evaluated under conditions in which the linear recording density is 1600 kFCI and the track density is 500 kFCI (surface recording density of 800 Gbits/inch$^2$), for each magnetic storage apparatus 100 assembled with a corresponding one of the magnetic recording media of the practical examples Emb1.1 through Emb1.10 and the comparison example Cmp1. It is confirmed that the BER is $1 \times 10^{-7}$ or lower, and low, for the magnetic storage apparatuses 100 assembled with the magnetic recording media of the practical examples Emb1.1 through Emb1.10.

It is confirmed that the value of LogBER is −7.5 to −7.8 and particularly low for the magnetic storage apparatuses 100 assembled with the magnetic recording media of the practical examples Emb1.6 through Emb1.10 having the high medium SNR.

On the other hand, it is confirmed that the value of LogBER is approximately $1 \times 10^{-4}$ and particularly high for the magnetic storage apparatus 100 assembled with the magnetic recording medium of the comparison example Cmp1.

From the evaluation results of Table 3, it is confirmed that the BER can be reduced in the magnetic storage apparatus assembled with the magnetic recording medium that includes the predetermined soft magnetic underlayer.

TABLE 3

|  | SOFT MAGNETIC UNDERLAYER | LogBER |
|---|---|---|
| Emb1.1 | Co—10 at %Fe | −7.1 |
| Emb1.2 | Co—20 at %Ni | −7.2 |
| Emb1.3 | Co—5 at %Fe—5 at %Ni | −7.1 |
| Emb1.4 | Co—15 at %Mn | −7.3 |
| Emb1.5 | Co—25 at %V | −7.2 |
| Emb1.6 | Co—20 at %Ru | −7.6 |
| Emb1.7 | Co—10 at %Fe—10 at %Ru | −7.7 |
| Emb1.8 | Co—20 at %Re | −7.5 |
| Emb1.9 | Co—6 at %Pt | −7.7 |
| Emb1.10 | Co—12 at %Pd | −7.8 |
| Cmp1 | — | −4.1 |

According to the embodiments and practical examples described above, it is possible to provide a magnetic recording medium and a magnetic storage apparatus having a high medium SNR and a good overwrite characteristic.

What is claimed is:

1. A magnetic recording medium comprising:
   a substrate;
   a magnetic layer including an alloy having an $L1_0$ type crystal structure; and
   a plurality of underlayers arranged between the substrate and the magnetic layer,
   wherein at least one of the plurality of underlayers is a soft magnetic underlayer formed by an alloy having a hexagonal close packed (hcp) structure and including Co metal or Co as its main component, with a (11•0) plane oriented parallel to a surface of the substrate.

2. The magnetic recording medium as claimed in claim 1, wherein the soft magnetic underlayer includes at least one kind of element selected from a group of elements consisting of Fe, Ni, Cr, Mn, V, Ru, Re, Pt, and Pd.

3. The magnetic recording medium as claimed in claim 1, wherein
   the plurality of underlayers include a predetermined underlayer formed by an alloy having a body centered cubic (bcc) structure and including Cr metal or Cr as its main component, and
   the soft magnetic underlayer is formed on the predetermined underlayer.

4. The magnetic recording medium as claimed in claim 3, wherein the alloy of the predetermined underlayer includes at least one kind of element selected from a group of elements consisting of Mn, V, Ti, Mo, W, Nb, and Ru.

5. The magnetic recording medium as claimed in claim 1, wherein
   the plurality of underlayers include a predetermined underlayer formed by an NiAl alloy or an RuAl alloy having a B2 structure, and the soft magnetic underlayer is formed on the predetermined underlayer.

6. The magnetic recording medium as claimed in claim 1, wherein the magnetic layer includes a FePt alloy having an $L0_1$ type crystal structure, or a CoPt alloy having an $L0_1$ type crystal structure, and at least one kind of material selected from a group of materials consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN.

7. A magnetic storage apparatus comprising:
a magnetic recording medium; and
a head configured to write information on and read information from the magnetic recording medium,
wherein the magnetic recording medium comprises:
a substrate;
a magnetic layer including an alloy having an $L1_0$ type crystal structure; and
a plurality of underlayers arranged between the substrate and the magnetic layer,
wherein at least one of the plurality of underlayers is a soft magnetic underlayer formed by an alloy having a hexagonal close packed (hcp) structure and including Co metal or Co as its main component, with a (11•0) plane oriented parallel to a surface of the substrate.

8. The magnetic storage apparatus as claimed in claim 7, wherein the soft magnetic underlayer of the magnetic recording medium includes at least one kind of element selected from a group of elements consisting of Fe, Ni, Cr, Mn, V, Ru, Re, Pt, and Pd.

9. The magnetic storage apparatus as claimed in claim 7, wherein
the plurality of underlayers of the magnetic recording medium include a predetermined underlayer formed by an alloy having a body centered cubic (bcc) structure and including Cr metal or Cr as its main component, and
the soft magnetic underlayer is formed on the predetermined underlayer.

10. The magnetic storage apparatus as claimed in claim 9, wherein the alloy of the predetermined underlayer includes at least one kind of element selected from a group of elements consisting of Mn, V, Ti, Mo, W, Nb, and Ru.

11. The magnetic storage apparatus as claimed in claim 7, wherein
the plurality of underlayers of the magnetic recording medium include a predetermined underlayer formed by an NiAl alloy or an RuAl alloy having a B2 structure, and
the soft magnetic underlayer is formed on the predetermined underlayer.

12. The magnetic storage apparatus as claimed in claim 7, wherein the magnetic layer of the magnetic recording medium includes a FePt alloy having an $L0_1$ type crystal structure, or a CoPt alloy having an $L0_1$ type crystal structure, and at least one kind of material selected from a group of materials consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN.

* * * * *